United States Patent [19]
Enoki

[11] Patent Number: 5,936,375
[45] Date of Patent: Aug. 10, 1999

[54] METHOD FOR ENERGY STORAGE FOR LOAD HOISTING MACHINERY

[75] Inventor: Masamitsu Enoki, San Mateo, Calif.

[73] Assignee: Paceco Corp., San Mateo, Calif.

[21] Appl. No.: 09/127,656

[22] Filed: Jul. 31, 1998

Related U.S. Application Data

[63] Continuation-in-part of application No. 08/964,919, Nov. 5, 1997.

[51] Int. Cl.[6] ........................................ H02P 1/24
[52] U.S. Cl. .......................... 318/727; 318/739; 318/801; 318/807; 318/53; 318/54; 318/65
[58] Field of Search .................................... 318/727, 739, 318/801, 807, 53, 54, 65

[56] References Cited

U.S. PATENT DOCUMENTS 4,663,536   5/1987   Roesel, Jr. et al. ................. 318/727 X

*Primary Examiner*—Karen Masih
*Attorney, Agent, or Firm*—Bruce & McCoy

[57] ABSTRACT

A method for energy storage and recovery for load hoisting equipment driven by an inverter controlled first induction motor and having a second inverter controlling a second induction motor which drives a flywheel whereby, utilizing rest power such as reverse power from the first induction motor when lowering a load and unused power at small load or idle to accelerate rotation of a flywheel, whereby energy is stored, and the system is reversed when a load is lifted and power is consumed whereby the flywheel causes the second motor to generate power and deliver it to the first motor.

3 Claims, 4 Drawing Sheets

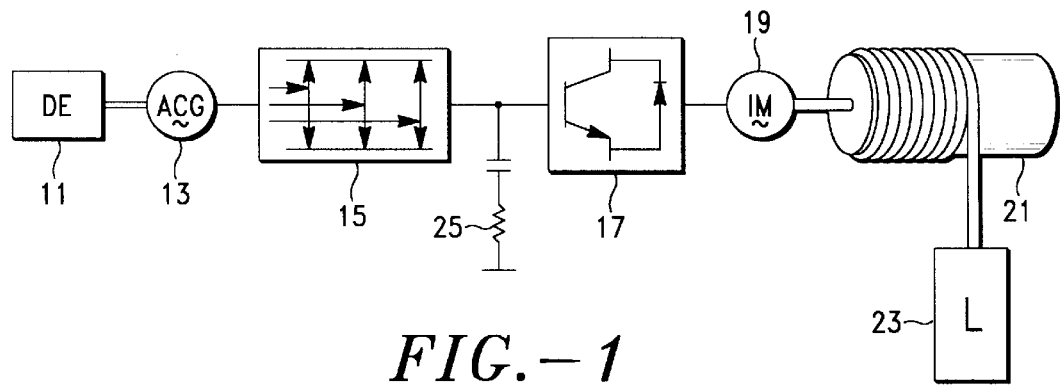
FIG.−1
(PRIOR ART)
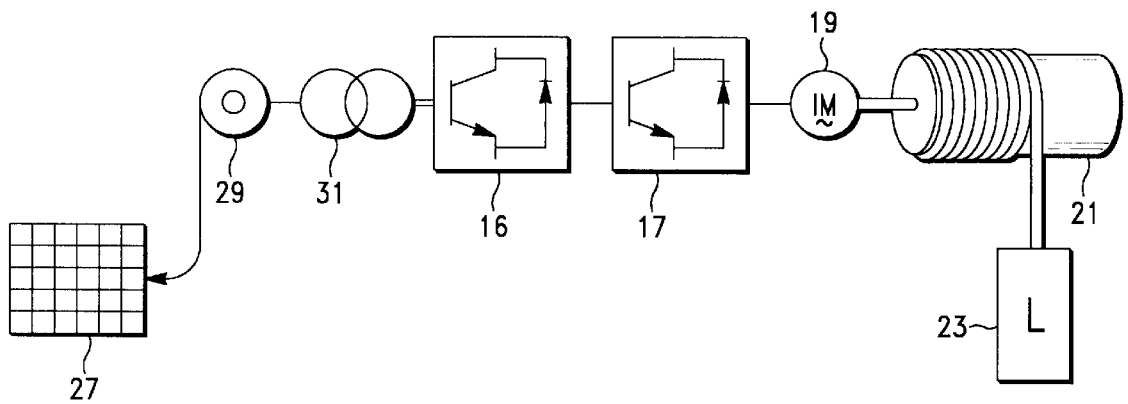
FIG.−2
(PRIOR ART)

METHOD FOR ENERGY STORAGE FOR LOAD HOISTING MACHINERY

RELATED APPLICATIONS

This is a continuation-in-part of U.S. patent application Ser. No. 08/964,919, filed Nov. 5, 1997.

BACKGROUND OF THE INVENTION

1. Field of the Invention

The present invention relates to a method for energy storage for use with load hoisting machinery. More particularly, it relates to a method for storing energy in a flywheel driven by an induction motor added to load hoisting machinery. The motor is powered during the load lowering process and when the hoist machinery is not consuming power. The energy is resupplied to the system when the load is being raised and needs more power.

2. Description of the Prior Art

The present invention relates to a system or method for energy storage in load hoisting cranes which are driven by electrical power. It is particularly useful for machinery which is driven by diesel-electric generators that experience a wide range of varying loads. The system stores energy at reverse or small load and supplies power at peak or large loads. Theoretically, this is a simple mechanical query, having as a result the benefit that the primary electrical source is only required to supply relatively constant average power and is not required to supply peak power. However, until now, the practical aspects of the query have prevented its use.

Battery combination and generator energy storage systems have been utilized to accomplish this result in the past, and theoretically they are very effective. However, in reality, the battery component imposes numerous problems such as: small electrical capacity, electrical inefficiency, large physical battery volume, heavy weight, and short battery life, whereby such a system is not currently a viable way to accomplish energy storage utilizing even state-of-the-art battery technology.

Flywheel type energy storage systems have also been utilized to accomplish the result. However, in order for the flywheel to store energy to create power, it must be capable of being driven over a wide range of speeds. In order to transmit the energy to the flywheel at the variable speeds, a DC motor has been utilized as most suitable, but the DC motor-driven flywheel has not been proven satisfactory for numerous reasons among which the following are most limiting:

1. In order for the flywheel to store energy, the energy is measured by $½ \times I \times \omega^2$ where I=the moment of inertia, and $\omega$=the rotating angular speed. Therefore, high rotating speeds can store much more energy in the flywheel because the energy is measured by a square of the rotational speed. However, the DC motor which must be interconnected to the flywheel has severe rotational speed limitations due to the weak centrifugal strength of its rotor's coil component;
2. The DC motor requires continuous maintenance such as brush replacement, commutator repair, and maintaining insulation integrity;
3. A DC motor is comparatively large, heavy, and expensive.

For these reasons and others, the flywheel-driven energy storage type system utilizing a DC motor has likewise not been a viable way to accomplish the result.

Recent developments in inverter technology have progressed to the point where AC squirrel cage induction motors using inverters are replacing DC motors. The inverter converts DC to AC with arbitrary frequency and also converts AC to DC in reverse. By virtue of the AC arbitrary frequency, the AC squirrel cage induction motor can rotate with arbitrary rotational speed up to very high speeds solving some of the described problems associated with DC motors.

FIG. 1 of the drawings shows a typical example of currently utilized dieselgenerator power sources and inverter controlled induction motor drive machinery for load hoisting machinery. The diesel engine 11 is mechanically interconnected to an AC generator 13. The alternating current output from the generator is converted to direct current by a diode 15. The DC, in turn, is converted to AC with an arbitrary frequency by the inverter 17. A squirrel cage induction motor 19 is driven by the AC and, in turn, drives a drum 21 which raises or lowers a load 23. The raising and lowering speeds are controlled as a result of the alternating current frequency generated and controlled by the inverter. When the load is lowered, reverse AC current is generated by the induction motor. The reverse current is consumed by a resistor 25 in order for the induction motor to operate effectively as degenerative braking.

FIG. 2 of the drawings discloses a typical example of current from a municipal utility power grid 27 being fed to the system by a cable reel power supply 29 instead of from the diesel engine/generator combination of FIG. 1. The incoming voltage is lowered by a transformer 31. The alternating current is then converted to DC by a DC converter 16 and, from that point on, the system is the same as disclosed in FIG. 1 of the drawings. During lowering of the load 23, reverse current is sent back to the power grid 27 and, in this example, is used by other consumers. However, since the reverse power current includes surge and deviant frequencies, other consumers dislike receiving it. It is expected that in the future sending reverse power back to the power grid may be prohibited. In that future sending reverse power back to the power grid may be prohibited. In that event, the reverse power will be consumed by a resistor, the same as disclosed in the system of FIG. 1.

The present invention is inserted into the system in place of the resistor as utilized in the prior art systems.

SUMMARY OF THE INVENTION

The method of the present invention is provided for the desired purpose of energy storage and recovery for load-moving machinery systems powered by an induction motor which is controlled by an inverter. The steps of the method of the invention comprise driving the induction motor of the load-moving machinery to act as a generator and create reverse power when the machinery is lowering or braking a load. The generated reverse power combined with unused power, which occurs when the machinery is at small load or idle, the combined powers being defined as rest power, drive a second induction motor. The rest power is controlled by a second inverter to drive a second induction motor. A flywheel is rotated by the second induction motor to store the rest power as energy. A rotational speed signal is generated proportional to the rotational speed of the flywheel. The voltage is measured at the power input side of the first inverter. The rotational speed signal and the measured voltage are transmitted to a programmable logic controller (PLC). The PLC controls the second inverter so as to convert DC to AC with a controlled frequency. By controlling the electrical frequency, the rest power can be stored in the flywheel as rotational energy or power can be retrieved from the flywheel to drive the second induction motor as a generator. The frequency is determined in the PLC by a programmed logic depending on the flywheel revolution speed and the measured voltage. The second induction motor is then rotated by the flywheel to produce power which is returned to the first motor when it is consuming power in excess of average power consumption.

OBJECTS OF THE INVENTION

It is therefore an important object of the present invention to provide a method for energy storage for the operation of induction motor-driven hoist machinery to reduce the overall power requirements for the operation of the machinery.

It is another object of the present invention to provide an improved method for energy storage for the operation of induction motor-driven hoist machinery to average out the power consumption requirements of the machinery.

It is a further object of the present invention to provide a method for the operation of induction motor-driven hoist machinery that eliminates the need to send power back to the source when the motor is driven by lowering the load or to absorb the power in a resistor or a brake.

And it is still another object of the present invention to provide a method for energy storage for the operation of induction motor-driven hoist machinery that can utilize a simple mechanical flywheel for electrical energy storage.

Other objects and advantages of the present invention will become apparent when the apparatus of the present invention is considered in conjunction with the accompanying drawings.

DESCRIPTION OF THE DRAWINGS

FIG. 1 is a diagram of a standard prior art drive machinery arrangement for an autonomous load-hoisting crane;

FIG. 2 is a diagram of an alternative standard prior art drive machinery arrangement for an electrical power-driven crane;

DESCRIPTION OF THE PREFERRED EMBODIMENT

Reference is made to the drawings for a description of the preferred embodiment of the present invention wherein like reference numbers represent like elements on corresponding views.

FIGS. 1 and 2 show the prior art of present practices as described above in the DESCRIPTION OF THE PRIOR ART portion of this specification.

Figure 3:
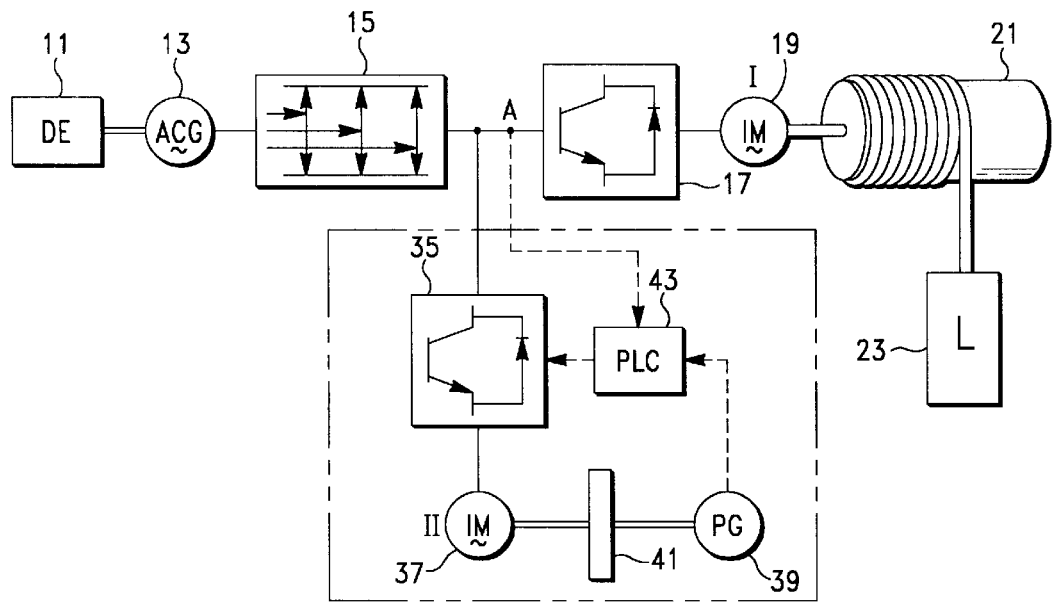
FIG. 3 is a modification of the prior art of FIG. 1 showing the inclusion of the energy storage system of the present invention therein.
Figure 4:
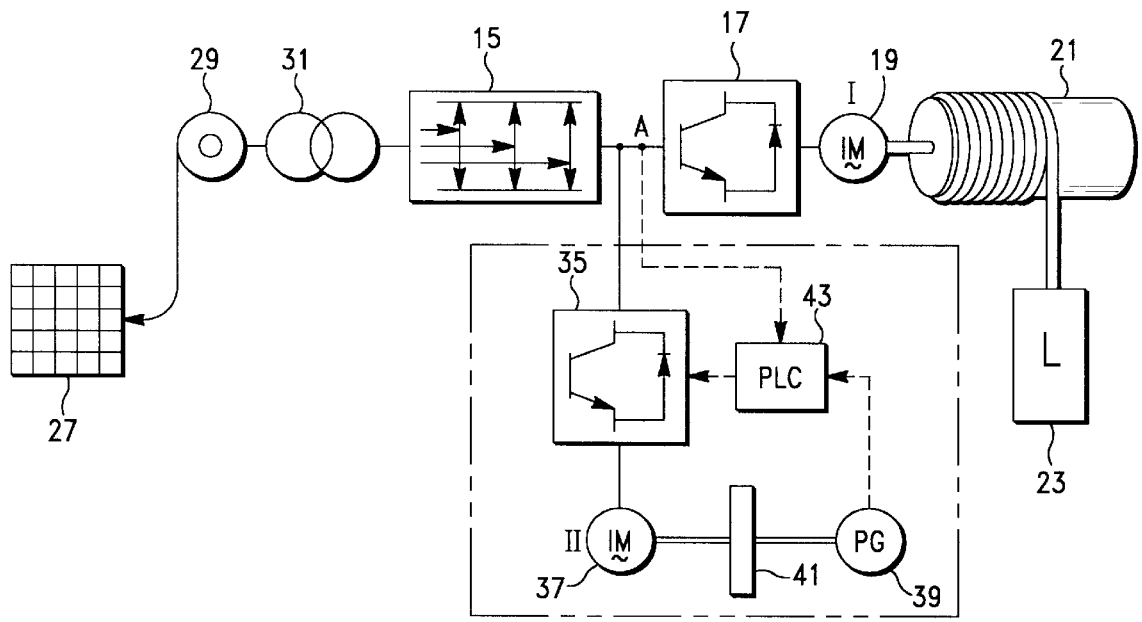
FIG. 4 is a modification of the prior art of FIG. 2 showing the addition of the energy storage system of the present invention thereto.

Reference is made to FIGS. 3 and 4 which show the additional apparatus of the present invention inserted into the apparatus of the prior art and present practice as shown in FIGS. 1 and 2. The prior art apparatus of FIG. 2 is no longer required because electrical current is not being sent back to the grid through a DC converter 16. The apparatus of the present invention replaces the resistor 25 of FIG. 1 which absorbs the electrical energy generated by the reverse operation of the induction drive motor 19 when the load 23 is being lowered by the load hoist drum 21 during the hoisting machinery lowering cycle.

When a load 23 is raised by the hoist machinery of the system 19 and 21, in both the prior art and the present invention, electrical energy from either a municipal utility power grid 27 (FIG. 4) or from an autonomous diesel engine power generator 13 (FIG. 3) is utilized to operate a first induction motor 19 which is connected by a mechanical power transmission means to the load hoist wire rope drums 21. Power is consumed by the induction motor during hoisting the load and generated by it during lowering of the load.

The invented energy storage system of the present invention is shown in FIGS. 3 and 4 encircled by the broken lines and is comprised of added machinery including: a second inverter 35, a second induction motor 37, a tachometer or pulse generator 39 which detects the rotational speed, a flywheel 41, and a programmable logic controller (PLC) 43.

When a load is being lowered by the hoist machinery 19 and 21 of either system, FIG. 3 or FIG. 4, energy is stored in the rotation of the flywheel 41. This occurs from the following obvious relationships: the load hoist drum 21 reverse drives its hoist motor, the system's first induction motor 19, during lowering of the load 23. The first induction motor acts as a generator creating AC current or reverse power. The generated AC current is converted to DC by the first inverter 17 and the DC current flows between the diode 15 and the first inverter 17. As a result, the voltage at the point A becomes high.

The voltage at the point A also becomes high when the load hoist machinery is at idle, stopping, or hoisting a light load. Electricity supplied from the main power source (the AC generator 13 in FIG. 3, or the municipal utility power grid 27 in FIG. 4) through the diode 15 elevates the voltage at the point A when the power consumption of the load hoist machinery is quite small or almost zero. This creates unused power. When the load hoist machinery hoists a heavy load, and its power consumption is large, the voltage at the point A becomes lower due to the lack of electricity.

The energy storage system of the present invention works so as to store both the unused power and the generated reverse power produced by the first induction motor 19 when it is driven to act as a generator when lowering a load. The combined unused power and the reverse power are defined for purposes herein as rest power.

The rest power is controlled by a second inverter 35. A second induction motor 37 is driven by the rest power and is controlled by the second inverter to rotate the flywheel 41. The rest power is stored in the flywheel rotational energy when the voltage at point A is high. The system works so as to retrieve power from the flywheel rotational energy and supply the lack of electricity when the voltage at the point A is low.

The measured voltage at point A, and the rotational speed detected by a tachometer or pulse generator 39 which is connected to the flywheel 41, are transmitted or inputted to the programmable logic controller (PLC) 43. The PLC controls the second inverter 35 so as to convert DC to AC with a controlled frequency. The frequency is controlled by a programmed logic in the PLC depending on the voltage at point A and the rotational speed of the flywheel. The voltage at the point A is compared with a set voltage value $V_0$ which can be pre-set manually in the programmed logic.

If the voltage at point A is higher than the set or predetermined value $V_O$, the PLC 43 commands the second inverter 35 to convert DC to AC with the frequency corresponding to the rotational speed plus alpha whereby the flywheel 41 is accelerated by the second induction motor 37 and power is stored in the flywheel as rotational energy. If the voltage at the point A is lower than the set value $V_O$, the second inverter controls the AC with the frequency corresponding to the rotational speed minus alpha whereby the flywheel is decelerated by the second induction motor, thereby generating power which is supplied to the first induction motor whereby energy is recovered from the flywheel. By controlling the frequency, the second induction motor can be controlled to act as either a motor or generator to accelerate the flywheel or retrieve energy from it.

Figure 5:
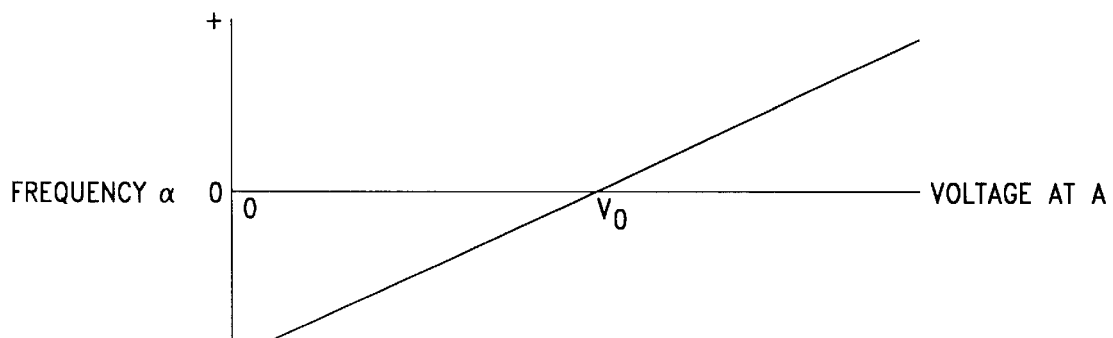
FIG. 5 is a graph showing the relationship of the frequency alpha and the voltage at point A in FIGS. 3 and 4 by which the second inverter controls AC frequency.
Figure 6:
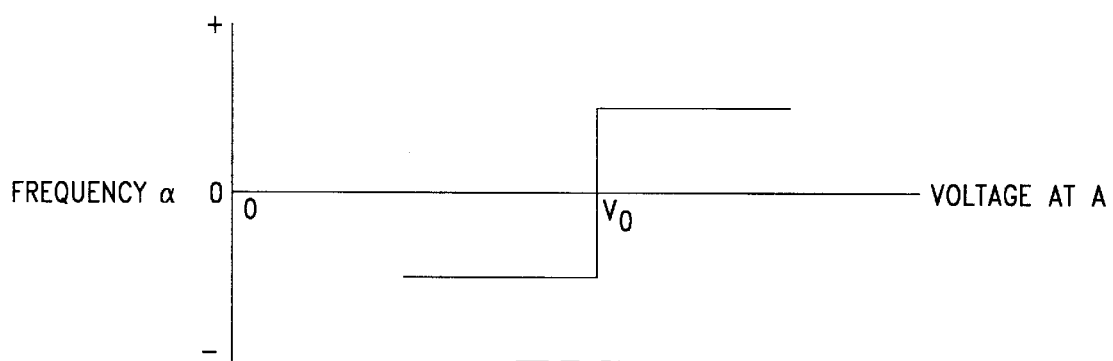
FIG. 6 is the basic relationship for the operation of the graph of FIG. 5.
Figure 7:
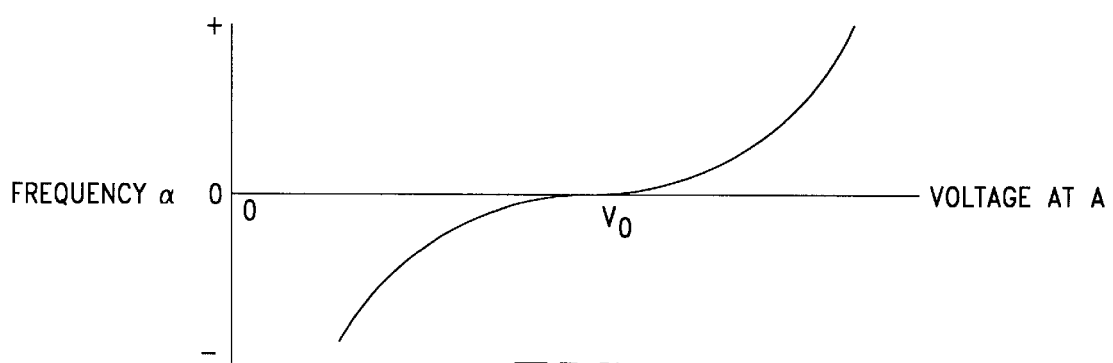
FIG. 7 is a more realistic relationship of the graph of FIG. 5 which is suitable for complex load variation in the operation of a crane.

Reference is made to FIGS. 5–7, as well as FIGS. 3 and 4, for the relationships of voltage at point A to the AC frequency alpha. The variable graph representations are set forth in the DESCRIPTION OF THE DRAWINGS. The frequency of alpha is determined depending upon the voltage at A. When the load on the hoist drum is small and there is no large power consumption, or reverse power results by the load being lowered, the voltage at A becomes higher than the set value $V_O$ in the controller which is close to the average voltage. In that event, the frequency alpha becomes a plus and energy is stored in the flywheel rotation. When the load is large and power is consumed, the voltage at A becomes lower than the set value $V_O$, and the frequency alpha becomes minus and energy is retrieved from the flywheel rotation.

When the voltage at A is the set value $V_O$, neither storage nor retrieval of energy is effected by the energy storage system. The set value $V_O$ is determined by the average load and mechanical and electrical efficiency. The reduced capacity requirements for the diesel engine and the AC generator permitted by the invention for the operation of the load hoisting machinery can be determined from the average load and mechanical and electrical efficiencies of the machinery.

Figure 8:
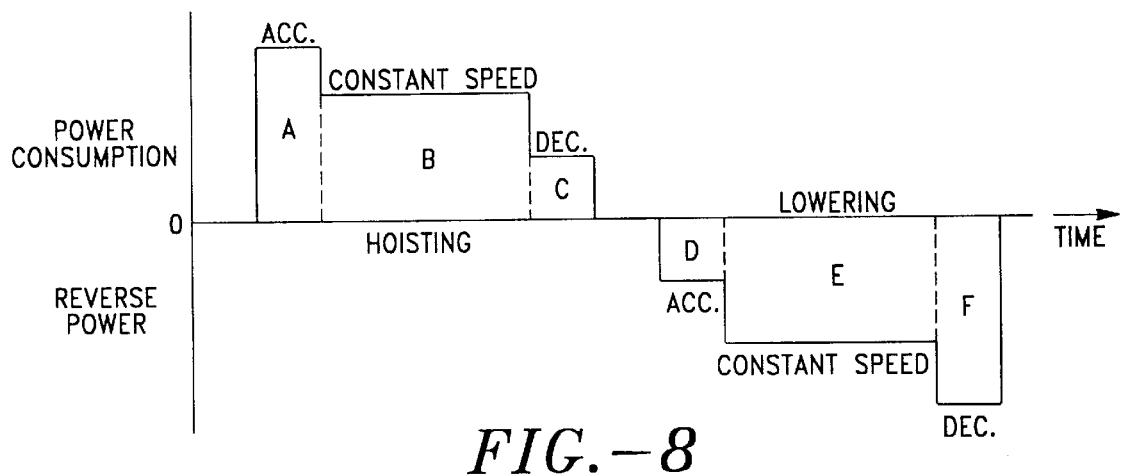
FIG. 8 is a basic power consumption graph for a standard prior art load moving machinery arrangement.

Reference is made to FIG. 8 which shows a graphical power consumption profile especially adaptable for the present invention. It can be utilized for load moving machinery where the loads being moved vary in large amounts or where large inertia changes occur due to acceleration and deceleration of the load, such as in hoisting machines, cranes, tractors, trains, etc. In case of a hoisting machine or a crane, a variable weight load is raised and lowered, and in doing so, the load is accelerated and decelerated. The power consumption of the induction motor for such operation with a specific load is shown graphically illustrated in FIG. 8 where: block A represents the power consumption required to accelerate the load to lift speed; block B represents the power consumption to move and lift the load at constant speed; block C represents the power consumption to stop the movement of the load; block D represents the reverse power or braking effect to permit the load to accelerate to lowering speed; block E represents the reverse power/braking effect to permit the load to lower at constant speed; and block F represents the reverse power/braking effect to stop the lowering of the load. When the load is hoisted, the system consumes power. When the load is lowered, the motor operates to generate power and act as a brake.

Figure 9:
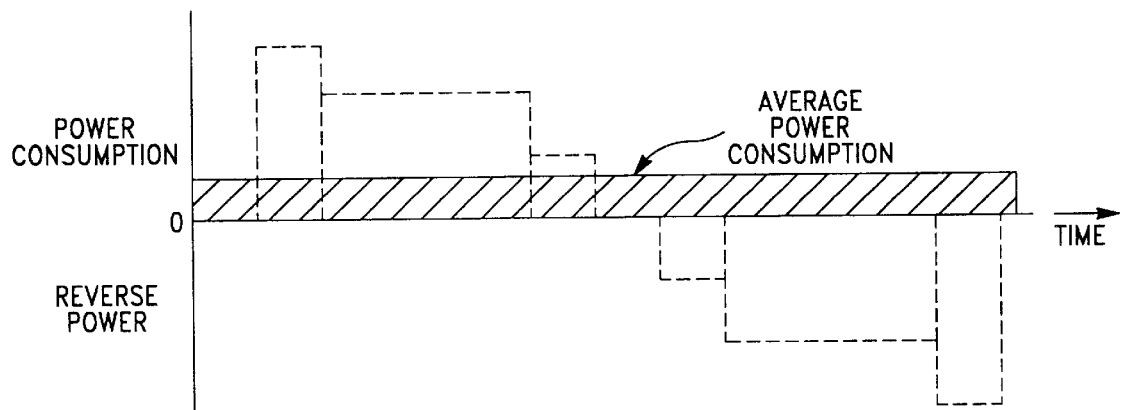
FIG. 9 is an idealistic power consumption graph representation for a drive machinery arrangement utilizing the method of the present invention.

Reference is made to FIG. 9 which shows the graphical power consumption profile which can be achieved with the use of the present invention. Power input is constant and there is unused power when the machinery is not lifting a load, such as when it is idling or at rest but not shut down. The average power consumption is represented by the cross-hatched area of FIG. 9 superimposed on the power consumption graph of FIG. 8.

Figure 10:
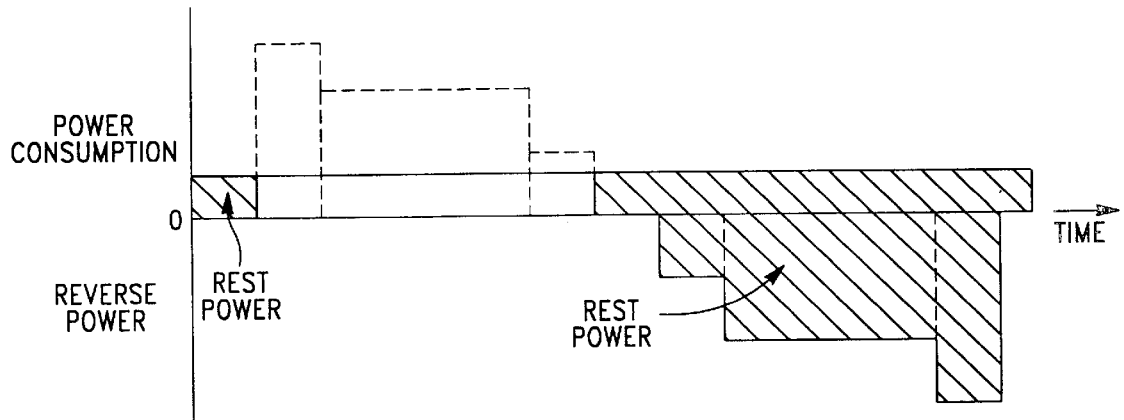
FIG. 10 is a power consumption graph of FIG. 9 defining rest power and showing the power to be stored.

FIG. 10 shows a graphical profile of rest power which is stored in the system of the present invention. When the energy storage system of the present invention is utilized, the rest power, including reverse power and unused power at small load or idle, is stored as flywheel rotation energy and the stored energy is retrieved as power in the peak load or large load situations. The rest power is represented by the reverse cross-hatched area in FIG. 10. The capacity of the main power source is sufficient to supply the average consuming power as shown in FIG. 9. If the load is lowered the same height as hoisted, the average power consumption is just mechanical and electrical efficiency losses.

The present invention comprises a method for energy storage and recovery for load moving machinery powered by a first induction motor which is controlled by a first inverter. The steps include: driving the first induction motor to act as a generator and create reverse power when lowering or braking a load. The reverse power combined with unused power when the load hoisting machinery is at small load or idle is defined as rest power. The rest power is utilized for driving a second induction motor, and the rest power is controlled by a second inverter. A flywheel is rotated by the second induction motor to store the rest power. When the first induction motor is consuming power in excess of its average power consumption, the second induction motor is rotated by the flywheel to supply power to the first induction motor.

The method of the present invention also includes generating a rotational speed signal proportional to the rotational speed of the flywheel and measuring the voltage at the power input side of the first inverter. The rotational speed signal and the measured voltage are transmitted to a programmable logic controller. The measured voltage is compared in the controller with a preset value for determining whether the second induction motor should drive or be driven by the flywheel. The method further includes that if the controller determines that the measured voltage is higher than the set value, the second inverter converts DC to AC with the frequency corresponding to the flywheel rotational speed plus alpha whereby the flywheel is accelerated by the second induction motor, and energy is stored in the flywheel rotation. Accordingly, if the voltage is lower than the set value, the second inverter controls the AC with the frequency corresponding to the flywheel rotational speed minus alpha whereby the flywheel is decelerated by the second induction motor thereby generating reverse power which is supplied to the first induction motor whereby power is recovered from the flywheel rotation.

Therefore, the energy storage system of the present invention is very effective so as to permit the reduction of the capacity of the diesel engine and the AC generator, or the amount of the draw from the power source, and which thereby contributes to an effective energy utilization and savings. Also, in the case that the power source is not stable and fluctuates, the energy storage system of the invention can be used as a power stabilizer.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. A method for energy storage and recovery for load moving machinery powered by a first induction motor which is controlled by a first inverter, the steps comprising driving said first induction motor to act as a generator and create reverse power when lowering or braking a load, said reverse power combined with unused power when said load hoisting machinery is at small load or idle, said combined powers being defined as rest power, utilizing said rest power for driving a second induction motor, controlling said rest power by a second inverter, rotating a flywheel by said second induction motor to store said rest power, and rotating said second induction motor by said flywheel to supply power to said first induction motor when said first induction motor is consuming power in excess of its average power consumption.

2. The method of claim 1 including generating a rotational speed signal proportional to the rotational speed of said flywheel, measuring the voltage at the power input side of said first inverter, transmitting said rotational speed signal and said measured voltage to a programmable logic controller, and comparing said measured voltage in said controller with a preset value for determining whether said second induction motor should drive or be driven by said flywheel.

3. The method of claim 2 wherein said controller determines that if said measured voltage is higher than said set value, said second inverter converts DC to AC with the frequency corresponding to said rotational speed plus alpha whereby said flywheel is accelerated by said second induction motor and energy is stored in said flywheel rotation, and if said voltage is lower than said set value, said second inverter controls the AC with the frequency corresponding to said rotational speed minus alpha whereby said flywheel is decelerated by said second induction motor thereby generating reverse power which is supplied to said first induction motor whereby power is recovered from said flywheel rotation.

* * * * *